United States Patent
Chopra et al.

(10) Patent No.: US 10,430,283 B1
(45) Date of Patent: Oct. 1, 2019

(54) INTELLIGENT DATA DISSEMINATION

(71) Applicant: EMC Corporation, Hopkinton, MA (US)

(72) Inventors: Shelesh Chopra, Bangalore (IN); Gururaj Kulkarni, Bangalore (IN); Vladimir Mandic, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 457 days.

(21) Appl. No.: 14/871,114

(22) Filed: Sep. 30, 2015

(51) Int. Cl.
  *G06F 11/14* (2006.01)

(52) U.S. Cl.
  CPC ...... *G06F 11/1451* (2013.01); *G06F 11/1453* (2013.01); *G06F 11/1464* (2013.01); *G06F 2201/80* (2013.01); *G06F 2201/84* (2013.01)

(58) Field of Classification Search
  None
  See application file for complete search history.

(56) References Cited

U.S. PATENT DOCUMENTS

| | | | | |
|---|---|---|---|---|
| 9,021,204 B1* | 4/2015 | Awasthi | ............ | G06F 12/08 711/117 |
| 2007/0186068 A1* | 8/2007 | Agrawal | ............ | G06F 11/1456 711/162 |
| 2011/0238628 A1* | 9/2011 | Osborne | ............ | G06F 11/3447 707/654 |
| 2014/0188804 A1* | 7/2014 | Gokhale | ............ | G06F 21/6218 707/645 |

* cited by examiner

*Primary Examiner* — Jau Shya Meng
(74) *Attorney, Agent, or Firm* — Workman Nydegger (57) ABSTRACT

Systems and methods for disseminating backup data sets to targets. Backup data sets are classified with an attribute. A gateway device between the backup application and potential target destinations for the backup data set determines where to send the backup data set based on the attribute.

19 Claims, 4 Drawing Sheets

400

| Client | Data Set | Profile Attribute |
|--------|----------|-------------------|
| Host 1 | /FS1/dir1 | Critical : NonSecured |
| Host 1 | DB1 | Critical : Secured |
| Host 2 | DB2 | Critical : Secured |
| Host 3 | / FS2 | Non Critical : NonSecured |

| Rule ID | Rule Name | Data Segregation | |
|---|---|---|---|
| 1 | DB Data | Critical | Secured |
| 2 | File System | Critical | Not Secured |
| 3 | Dormancy | Not Critical | Not Secured |
| 4 | Change Rate | Critical | Secured |

*FIG. 3*

| Client | Data Set | Profile Attribute |
|---|---|---|
| Host 1 | /FS1/dir1 | Critical : NonSecured |
| Host 1 | DB1 | Critical : Secured |
| Host 2 | DB2 | Critical : Secured |
| Host 3 | / FS2 | Non Critical : NonSecured |

*FIG. 4*

| Profiled Attribute | Target Device |
|---|---|
| Critical NonSecured | Private Cloud : Device |
| Critical Secured | Private Cloud : Device |
| Non Critical Non Secured | Public Cloud : Tape |

INTELLIGENT DATA DISSEMINATION

FIELD OF THE INVENTION

Embodiments of the present invention relate to systems and methods for protecting data. Embodiments of the invention further relate to systems and methods for disseminating data sets such backup data sets to different destinations or targets.

BACKGROUND

Data protection is a common component of most computing systems. Data protection software such as backup applications, which protect data by storing backup data sets of source data sets, are under pressure to do more with fewer resources and optimize costs. Over time, data protection software has made many improvements. Backups, for example, can be de-duplicated and the backup data sets are configured such that is possible to restore data as the data existed at various points in time. Backup sets can also be stored in the cloud. When backup data sets or other data is stored in the cloud, IT (Information Technology) as a service often plays a role. A backup application can be provided as a service, although the backup application is still associated with software components.

Some backup applications today use the cloud to store backup data sets. In these situations, however, no consideration is given to the data that is being backed up. The backup data sets are simply moved to the cloud: client x is backed up to target y. This can result in potential problems. For example, current backup applications do not classify the data or consider the type of data being backed up. In systems where data is not classified in the context of where the backup data set will be stored, the backup application does not have the ability to dynamically adjust the target or destination of the backup data set to the type of data included in the backup data set. For example, if characteristics of the source data set change, conventional backup applications do not reconsider where the backup data sets is stored. Rather, the destination or target on which the backup data set is stored may depend on the client name. Further, conventional backup applications do not have the ability to scale.

Systems and methods are needed to intelligently disseminate data sets including backup data sets to targets. Systems and methods are need that can dynamically adjust the destination or target based when the source data changes.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for protecting data and more particularly to systems and methods for backing up data. Embodiments of the invention further relate to systems and methods for disseminating backup data sets to different target devices or to different destinations. Embodiments of the invention may incorporate a gateway device that can cooperate with a backup server to disseminate backup data sets. The gateway device may sit between the backup server and the targets and have the ability to select specific targets for specific backup data sets. The backup data set can also be transferred directly from the client to the destination.

In one embodiment, backup data sets are disseminated or directed to different devices or targets. A target is an example of a device of system of devices on which the backup data sets are stored. Datacenters and other cloud based storage are examples of targets. Targets may also be local to a computing system. The target selected for a particular backup data set can depend on how the backup data set is classified and profiled. Thus, embodiments of the invention are able to direct backup data sets to particular targets based on the type of data being backed up or based on the content of the backup data set.

In one example, the source data sets are profiled based on the content of the source data sets and/or other characteristics or attributes of the source data sets. Data sets profiled as critical or secured, for example, are sent to one target while data sets profiled as non-critical are sent to a different target. Examples of targets or destinations include, but are not limited to, a public cloud, a private cloud, an external device or an internal device (e.g., with respect to a network or intranet of a data owner), or the like. Embodiments of the invention relate to systems and methods for determining which target to use for the backup data sets that are present in a computing system. Different backup data sets may thus be sent to different destinations. The backup data set of a file server, for example, may be sent to a different target than the backup data set associated with an email server or other client.

In one example, the backup application (or component of the backup application) scans through the data set or data sets of a client or clients to collect information or metadata about the data sets. The backup application may also generate metadata in some examples that relates to or describes the source data set. The collected and/or generated metadata may be stored in a results database. The backup application then applies rules to the metadata and/or the data set itself in order classify the data. The rules can be complex or simple and can be default rules or customized rules. In one example, data is classified by segregating the data based on criticality and/or security concerns. The results of the classification may also be stored in the results database.

When the data sets are classified, the data sets may be assigned a profile attribute during the classification process that may be stored in the results database or in a gateway database. The profile attribute may represent the criticality of the data set (or portion thereof) or the need for security for the data set (or portion thereof). The profile attribute may be stored in a gateway database or made available to the gateway. The profile attribute may be accessed as necessary when transmitting the backup data set to the target. When a backup data set is sent to a target for storage, the gateway or client evaluates the backup data set and sends the backup data set to a particular target based on the analysis. In one example, the gateway becomes an interface between the backup data sets being backed up and the backup targets or storage destinations. However, clients may send backup data sets directly to the appropriate targets. The gateway may map the backup data sets to a target based on the profile attribute of the backup data set or of the source data set. Thus, the gateway is able to direct the backup data sets to specific targets based, in one example, on the profile attributes associated with the backup data sets. The backup server and/or gateway can analyze the criticality and/or security needs of the backup data sets and ensure that the backup data sets are transmitted to and stored in an appropriate target.

Figure 1:
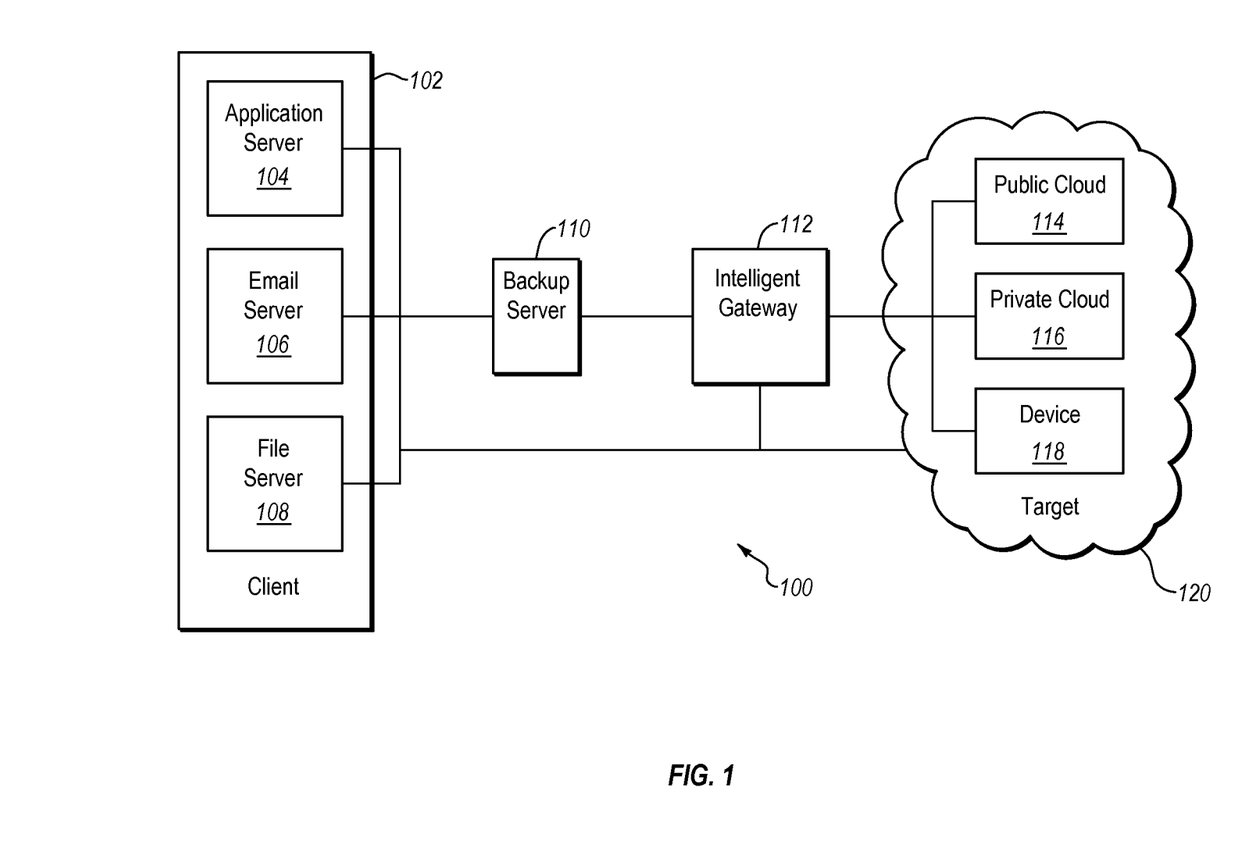
FIG. 1 illustrates an example of a backup system operating in a computing environment that intelligently distributes backup data.

FIG. 1 illustrates an example of a backup system or application operating in a computing system that is capable of disseminating backup data sets to different targets or destinations. FIG. 1 illustrates a backup server 110 that is configured to backup the clients 102 or the data sets of the clients 102. The clients 102 may include, by way of example and not limitation, an application server 104, an email server 106, and/or a file server 108. Each of the clients 102 is associated with a data set that is backed up as a backup data set. Each of the clients 102 may be associated with the same data set or with different data sets. Each of the clients 102 may be associated with multiple data sets. For example, the file server 108 may include multiple partitions or volumes and each volume may constitute a data set that is backed up in its own backup data set. Similarly, the email server 106 and the application server 104 may similarly be associated with one or more data sets that are backup up in a single data set or in different data sets.

Generally, the backup server 110 can communicate with the clients 102 or with agents operating on the clients 102 to generate the backup data sets. The backup server 110 can coordinate the process of generating the backup data sets and may also be associated with a storage device for storing the backup data sets. The device 118, for example, may be a storage device connected with the backup server 110.

Initially, the backup server 110 may initiate a backup operation. This may be done according to a schedule or an event. The client being backed up may then prepare a backup data set to be saved. A session may then be requested with the backup server 110. In on example, the backup server 110 may then evaluate the backup data set in order to determine where the backup data set should be stored. The backup server 110 then directs the client toward a specific target based on rules. In one example, the rules identify the type of data contained in the backup data set. This analysis can be performed quickly in one example. The backup data set may be profiled as, by way of example and not limitation, critical, non-critical, secured, and/or non-secured. The target for the backup data set can then be identified based on the profile attribute.

The manner of transmitting the backup data set can also vary. In addition, the target can be determined at different times. For example, if the backup data set is transmitted to a target through a gateway 112, the gateway 112 may be able to select the target based on the profile attribute and direct the backup data set to the appropriate target. In another example, the client may transmit the backup data set directly to the appropriate target based on the profile attribute. In another example, the backup server 110 may be involved in transmitting the backup data set to a target. In another example, the backup server 110 controls the process and may not be involved in the path of the backup data set.

More specifically, FIG. 1 also illustrates an intelligent gateway 112 that may be located or placed between the backup server 110 and targets 120 or between the clients 102 and the targets 120. FIG. 1 illustrates that a data path of the backup data sets prepared by at the clients 102 may include the backup server and/or the intelligent gateway 112. The data path may be directly between the clients 102 and the targets 120.

The targets 120 are examples of destinations or devices on which the backup data sets are stored. Each of the targets 120 may have different characteristics. Example targets include, but are not limited to a public cloud 114, a private cloud 116, a device 118. Some of the targets 120 may be local to or inside the computing network 100 and others may be connected to the computing system 100, for example, by the Internet.

The public cloud 114, in one example, includes hardware that may be shared among multiple users including unrelated users or entities. In a backup context, the backup data sets of one entity may be stored on the same devices that store the backup data sets of other entities or users. This does not mean that users have access to each other's data. Rather, the security of the public cloud may not be controlled by the owner of the data. It may not be desirable to store data sets deemed critical or secured in the public cloud.

The private cloud, by way of example, may be dedicated to a particular user or entity even if provided in a data center accessible over the Internet or other network. The private cloud 116 usually provides greater control and greater security to the data owner. The data owner, in one example, may also own the private cloud 116. These characteristics may make the private cloud 116 a better choice for some types of data than the public cloud 114. For example, users that are subject to strict regulatory or government obligations may elect to store their data in a private cloud. A private cloud may be hosted on an intranet or in a data center by way of example only.

The device 118 is an example of a storage device that is specific to the computing system 120 and may be on-site or inside the computing system. The device 118 could, in one example, be accessible over the Internet as well. The device 118 may be used to store the critical and sensitive data or data that needs to be stored securely or data that needs to be protected.

The backup server 110 or backup application includes various modules that may be used to classify the data sets. Once the backup data sets are classified and assigned a profile attribute, the intelligent gateway 112 can analyze the backup data sets being sent to storage and direct the data sets to the appropriate target based on the profile attribute. As previously stated, the client may also be able to transmit the data based on the profile attribute as well. The gateway 112 has intelligence or has access to intelligence that allows the gateway 112 to disseminate the backup data sets to specific destinations or targets 120. The clients 102 may also have access to the same intelligence such that the clients 102 can transmit the backup data sets to an appropriate target. The gateway 112 is not necessarily responsible for characterizing or classifying the backup data sets. Rather, the gateway 112 may decide where to send the backup data sets.

The backup data sets can be transmitted to the targets on different data paths. Embodiments of the invention can classify the backup data sets (or the source data sets prior to generating the backup data sets) such that the intelligence used to identify the target can be accessed by the device that determines the target for the backup data set.

Figure 2:
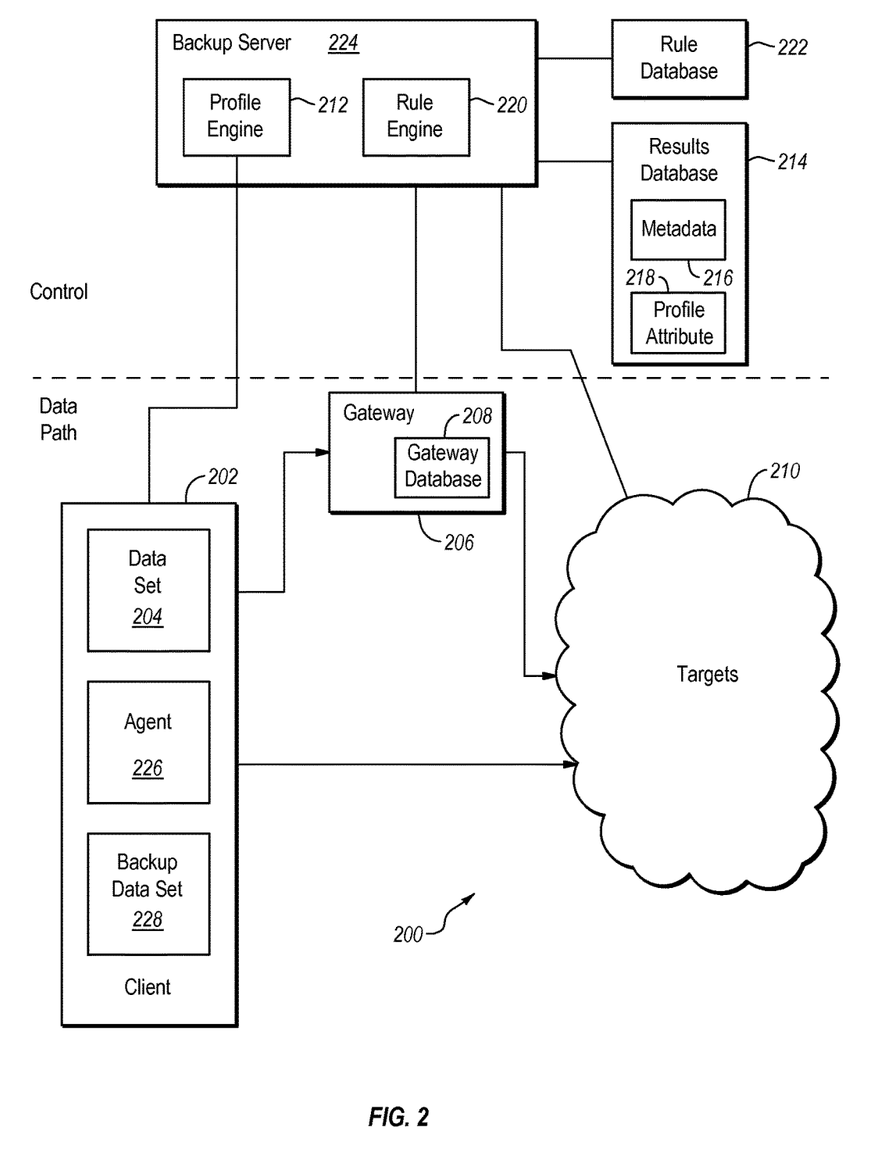
FIG. 2 illustrates an example of a backup application configured to evaluate data sets and distribute the backup data sets to different destinations.

FIG. 2 illustrates an example of systems and methods for backing up data and more particularly to intelligently disseminating backup data sets to specific targets. FIG. 2 illustrates a backup server 224 that is capable of communicating with a client 202, a gateway 206, and the targets 210. FIG. 2 illustrates that the dissemination of backup data sets (or other data sets) may involve both a control path and a data path. As illustrated in FIG. 2, the backup server 224 is part of the control path of the backup operation. The backup server 224 can communicate with the gateway 206 and the client 202 when a backup operation is performed. Once the backup data set 228 is generated and profiled, the data path to an appropriate target 210 may vary. Further, the device that ultimately directs the backup data set to the appropriate target may exist at a point in the data path. For instance, if the gateway 206 is configured to determine the target, then the data path may pass through the gateway 206, although the gateway 206 could determine the target without actually being part of the data path. In another example, the target may be determined by the client 202.

The backup server 224, which is an example of the backup server 110, may include components or modules that are used in performing the backup operation of a data set. One of skill in the art can appreciate that modules and components of the backup application discussed herein can be implemented in either the backup server 224 or the gateway 206 or on a client in some examples. In one example, the backup server 224 may control the backup operation. The backup server 224 may coordinate with an agent 226 to generate a backup data set 228 from the source data set 204. The backup data set 228 may be smaller than the data set 204 and may include, by way of example, only blocks or files that have changed since an earlier backup operation.

When performing the backup operation (or before the backup operation is initiated) a profile engine 212, for example, may scan the data set 204 (and other data sets of a computing system) of the client 202. Alternatively, the profile engine 212 may scan the backup data set 228 at least because the backup data set 228 is being sent to a target 210. The results of the scan may be stored as metadata 216 in a results database 214. The metadata may include size of data, access privileges (e.g., read/write), timestamps, author, change rate, de-duplication quotient, compression quotient, encryption, pay-per-use data, security designation or other user provided attribute, or the like. One of skill in the art is aware of other metadata associated with the data set 204 even if not enumerated herein.

A rule engine 220 uses a rule database 222 to apply rules to the metadata 216 and/or the data set 204 and/or the backup data set 228. The results of applying the rules in the rule database 222 are also stored as profile attributes 218. Applying the rules in the rule database 222 to the data collected from the data sets is an example of classifying the data sets and assigning a profile attribute to the data set. In one example, profile attributes are assigned to the entire data sets. In another example, different portions of the data sets may have different profile attributes. By profiling the data sets, the data sets are effectively segregated by the profile attributes. The data sets can be profiled as critical, secure, non-critical, and non-secure and/or combination thereof by way of example only.

In one example, the source data set 204 may be profiled as discussed herein. In this case, any backup data set generated from the data set 204 is automatically associated with the same profile attribute. This may allow the backup operation to be performed without having to classify any data during the backup operation itself. In another example, the backup data set 228 is profiled after being generated. This can be performed under control of the backup server 212. After a profile attribute is determined, then the target for the backup data set 228 can be identified.

Figure 3:
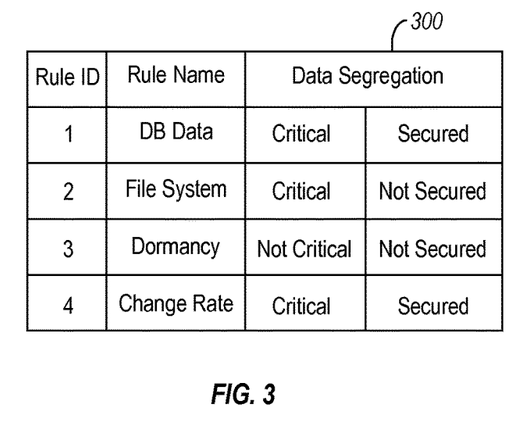
FIG. 3 is an example of metadata that includes results of an analysis of the backup data.
Figure 4:
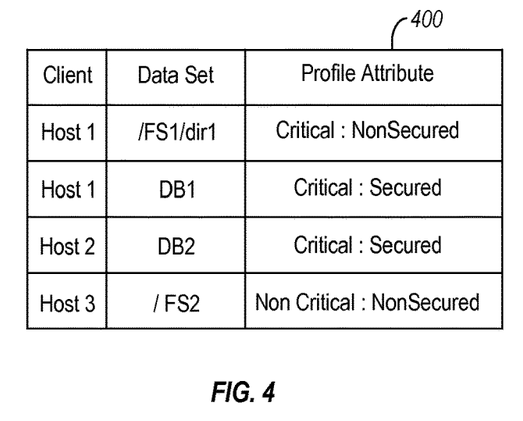
FIG. 4 illustrates an example of rules that are used in disseminating backup data sets to different destinations.
Figure 5:
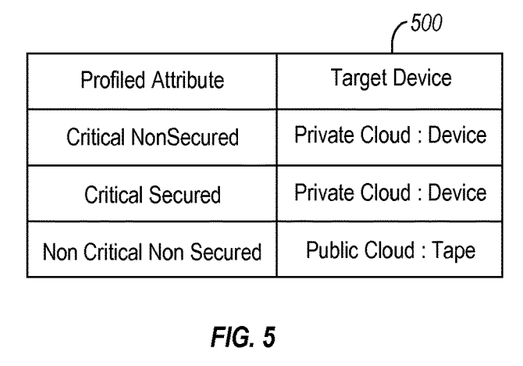
FIG. 5 illustrates an example of profiles used in disseminating backup data sets.

The data path and control path are further described with reference to FIGS. 3, 4 and 5. The information shown in FIGS. 3-5 can be changed by a user without regard to the outcome of the rules. This allows a user to specify FIG. 3 illustrates an example of rules that may be stored in the rule database 222. The rules 300 in this example each have a rule identifier, a rule name, and a data segregation attribute. As the rule is applied to the metadata 216 and/or the backup data set 228 and/or the data set 204, the outcome of the rule relates to how the data should be segregated. The backup data set 228 can be segregated according to its content and the target for the backup data set 228 can be selected based on the content or type of data in the backup data set 228. In one example, the rules 300 segregate the data by determining whether the data is critical or non-critical and by determining whether the data is secured or non-secured. Segregating the data effectively classifies the data sets and assigns at least one profile to the data set being classified. Additional segregations could be determined and embodiments of the invention are not limited to any specific segregations. Other segregations can be identified and the segregations could be more granular.

Rule 1, for example, is a rule that if true segregates the data set as critical and secured. Rule 2 segregates the data set as critical and non secured. Rule three segregates the data set as not critical and not secured. Other rules may be implemented as previously described. Further, the outcome of the rule, by way of example only, segregates the data or assigns a profile attribute of critical, secured, non-critical and/or non-secured, or combination thereof.

In one example, applying the rules to classify the data sets by segregating the data results in profile attributes. FIG. 4 illustrates an example of a table 400 that associates profile attributes to specific data sets or to specific backup data sets or portions thereof. In other words, the table 400 is a table that associates the profile attributes determined from the rules to the data sets. As previously stated, any profile attribute assigned to the data set 204 may be applied to any backup data set 228 derived from the data set 224. The table 400 identifies the specific profile attributes of specific data sets. The table 400 is an example of results obtained from applying the rules 300 to the metadata 216 or to the data sets scanned by the profile engine.

After the data is classified or segregated in this manner, a relationship between the profile attributes 218 and targets 210 is stored in an intelligent database 206 associated with the gateway 206. The database 206 may also be available to the backup server 224 and the client 202. FIG. 5 illustrates an example of the relationships between the profile attributes and the target 210. The table 500 of FIG. 5 identifies the profile attributes and target devices. The table 500 may identify multiple targets for a given profile attribute. In one example, the targets are listed in order of preference. If the first target is unavailable, the backup data sets may be stored in the next target identified in the table 500.

In one example, the table 500 is used by the intelligent gateway 206 to map the backup data sets to various target devices based on their profile attributes. The intelligent gateway 206 may not classify the backup data sets, although it can be configured to classify the backup data sets. In one embodiment, the gateway 206 disseminates the backup data sets based on the profile attributes. Thus, when a backup data set is transmitted through the gateway 206, the gateway 206 may determine the target for the backup data set and send the backup data set to the determined target. As previously stated, the client 202 may also transmit the backup data set directly to the target identified from the gateway database 208.

When a backup set generated by the backup server 224 or by an agent operating on the client 202, the backup data set is sent to a target included in the targets 210 directly or through the gateway 206. The gateway 206 may direct the backup data set to the appropriate target based on the profile attributes.

Figure 6:
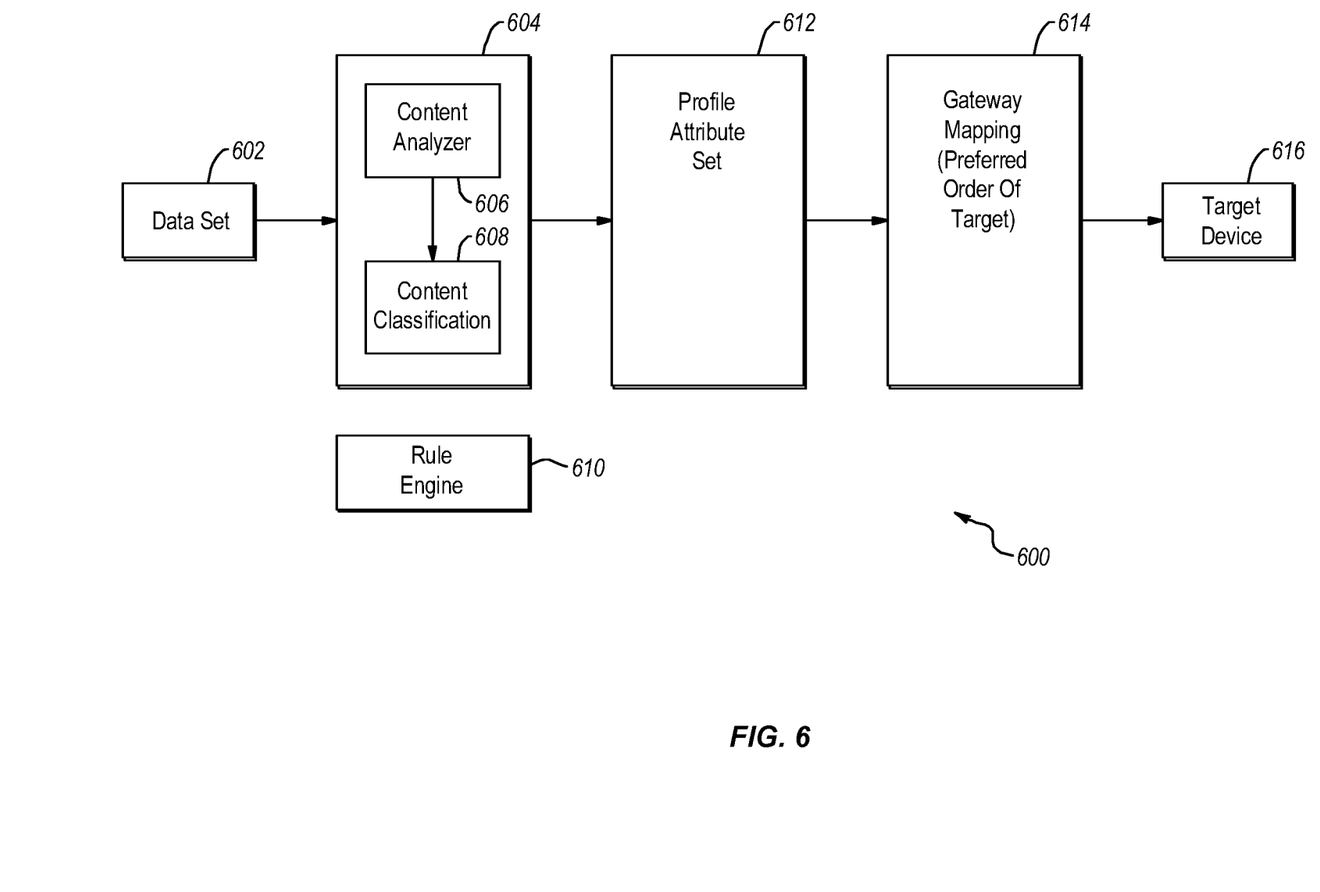
FIG. 6 illustrates an example of a method for intelligently distributing backup data sets.

FIG. 6 illustrates an example of a method for disseminating a backup data set to a target. FIG. 6 illustrates a data set 602. The data set 602 is scanned by the profile engine and the rule engine 610 classifies the data set 602. The rule engine processed the data set and/or metadata collected by a profile engine) using predetermined rules that analyze the data. The rule engine 610 may, in block 604, use a content analyzer 606. The content analyzer 606 fetches rules from the rules database. The content classification engine 608 is then asked to classify the data set with profile attributes using the rules. The content classification engine 608 may apply the rules to the metadata collected by the profile engine and/or to the data set 602. The rule engine 610 operates to determine at least one profile attribute for the data set 602.

The rule engine 610 may apply all of the rules or some of the rules. In one example, the rules database may include rules that are specific to different types of data sets. As a result, the rule engine 610 may apply first rules to a file server and may apply second rules to a database.

This results or outcomes of the rules result in a profile attribute set 612 for the data set 602. Once the profile attribute set 612 is determined, the data set can be mapped to a target by a gateway 614. Alternatively, the any device can transmit the data set to the appropriate target using the profile attribute set 612. Once the gateway 614 identifies the profile attribute of the data set 602, the table 500 is used to map the profile attribute to a target device. The gateway 614 may have access to an ordered list of targets, for example as illustrated in FIG. 5. Once the target is identified for the data set 602, the data is disseminated to the selected target device 616. The target device 616 may be any one of the targets 120 shown in FIG. 1.

In some examples, the target is effectively determined by the profile attribute. When the profile attributes relate to the security or criticality of the underlying data, then the content or type of data is analyzed to determine how secure or how critical the data is. Data determined to be critical and secure is typically mapped to the most secure target (e.g., the device 118).

Example rules include, but are not limited to (the profile attributes of these rules can be, but are not limited to, those discussed herein):

Find last valid full backup data set during last month and select the full backup data set for replication;

Schedule based replication to Cloud—Data in nearline storage for X months can be moved to cloud;

Data tagged mission critical will go to nearline storage (e.g., device 118) or Private Cloud;

If Data Deduplication quotient is >50%, data can go to the Public Cloud;

If Compression quotient is >75%, data can be transmitted to the Public Cloud;

If encryption is enabled, data shouldn't go to Public cloud, can go to private cloud;

If backup is selected for pay-per-use, data can go to Public cloud; and

Data is termed secured either by user or by SMART application, it can only go to nearline storage The outcome of these rules may be entity dependent. By way of example and not limitation, the above rules are merely examples. Further the outcome of these rules generates profile attributes that can be used to disseminate the data set. The profile attribute of a particular rule, however, may be determined by an entity or may be set by default as illustrated, for example, in FIGS. 3-5. For example, the last full backup rule may result in profile attributes of critical and non-secure. Rules sending the data to the private cloud may have profile attributes of critical and non-secured.

One of skill in the art can appreciate that all rules cannot be enumerated herein. Example rules that are applied to segregate or classify the data include, but are not limited to: selecting the last valid full backup during a predetermined time period for replication; data that has been stored locally for a certain number of months may be deemed non-critical and may be stored in the public or private cloud; data tagged as mission critical may go to a local device (nearline storage); if the data deduplication quotient is above a predetermined percentage or if the compression quotient is greater than a predetermined percentage, the data set is not non-critical and non-secured and may go to the public cloud; if the backup is selected for pay-per-use, the data can go to the public cloud; if the data is deemed secured by a user or an application, it is directed to nearline storage.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. The profile engine, rule engine, content analyzer, content classification are examples of modules or components. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The devices and servers and clients may each include one or more processors, memory, controllers, ports and the like to perform the methods disclosed herein and to communicate over a network, which includes sending and receiving data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for storing a backup data set, the method including:
   a control path that includes a backup server that, the control path including:
       profiling, by a processor, a data set to be backed up with a profile engine component of a backup application operating on a backup server to collect data about the data set;
   applying rules to the collected data with a rule engine to classify the data set and determine at least one profile for the data set, wherein the at least one profile determines a criticality of the data set and a security need of the data set;
   associating the at least one profile with the data set; and sending the data set over a data path that includes a gateway device, the at least one profile sent with the data set;
   mapping, by the gateway device, the at least one profile to a database that stores relationships between profiles and targets;
   identifying, by the gateway device, a target for a backup data set of the data set based on the at least one profile and the database; and
   directing the backup data set to the identified target by the gateway device, wherein the gateway device is not part of the control path.

2. The method of claim 1, further comprising storing the collected data in a results database and accessing the rules from a rules database, wherein the rules classify the data set as at least one of critical, non-critical, secure, and non-secure.

3. The method of claim 2, wherein the rule engine includes a content analyzer that retrieves the rules from the rules database and a content classifier that classifies the data set by applying one or more of the rules to the collected data.

4. The method of claim 1, further comprising storing the collected data and the at least one profile in a results database, wherein the at least one profile can be changed by a user.

5. The method of claim 1, further comprising changing the target associated with the at least one profile by changing the target associated with the at least one profile in the database.

6. The method of claim 1, wherein the target associated with the at least one prolife includes a list of targets ordered by priority.

7. The method of claim 6, wherein sending the backup data set to the identified target includes one of:
   sending the backup data set to a public cloud, a disk or a tape when the at least one profile is non critical and/or non-secured;
   sending the backup data set to a private cloud, a local device, or tape when the at least one profile is critical and/or non-secured; or
   sending the backup data set to a private cloud, a local device, of a disk when the at least one profile is critical and/or secured.

8. A method for disseminating a backup data set to a target, the method comprising:
   receiving, by a processor, a backup data set at the gateway device that, the backup data set prepared by a backup server that is part of a control path configured to profile the backup data set;
   determining, by the gateway device, a profile attribute of the backup data set in the control path by profiling the backup data set to be backed up with a profile engine component of a backup application to generate the profile attribute, wherein the profile attribute includes a criticality of the backup data set and a security need of the backup data set that are determined by applying rules to classify the backup data set and determine the criticality and the security need from the classified backup data set;
   mapping the profile attribute to a database accessible to the gateway device that stores relationships between profiles and targets as part of the control path;

identifying a target storage location as part of the control path based on the profile attribute and the database, wherein the target storage location is associated in the database with a stored profile attribute that matches the profile attribute determined for the gateway device; and directing the backup data set to the target storage location for storage using a data path that is determined by the gateway device, wherein the data path and the control path are independent and are not required to be the same.

9. The method of claim 8, wherein mapping the profile attribute includes selecting the target device from an ordered list of targets.

10. The method of claim 8, wherein the profile attribute includes one or more of critical, non-critical, secured, or non-secured and the target is one of a public cloud, a private cloud, or a device, the method comprising one of:

sending the backup data set to the public cloud when the profile attribute is non-critical and/or non-secured;

sending the backup data set to the private cloud or the device when the profile attribute is critical and/or secured; and sending the backup data set to the private cloud or the device when the profile attribute is critical and/or non-secured.

11. The method of claim 10, wherein the device is local to a computing system in which the backup data set is generated.

12. The method of claim 8, further comprising updating the gateway database to change the targets associated with the profile attributes.

13. The method of claim 8, further comprising receiving multiple data sets at the gateway device and disseminating the multiple data sets to targets based on profile attributes of the multiple data sets, wherein at least some of the multiple data sets are sent to different targets.

14. A gateway device arranged to communicate with a backup server and a plurality of targets configured to store backup data sets, the gateway device comprising:

a processor;

a memory, wherein the memory stores a database that sets forth a relationship between profile attributes and the plurality of targets, wherein the memory stores computer executable instructions that, when executed by the processor, cause the processor to perform a method for disseminating a backup set to one of the targets, the method comprising:

receiving a backup data set at a gateway device from the backup server, wherein the backup server;

determining a profile attribute of the backup data set by the gateway device or by receiving the profile attribute from the backup server, wherein the profile attribute is generated by a control path that is configured to apply rules to the backup data set to collect data from the backup data set and determine a criticality and a security need of the backup data set from the collected data, wherein the criticality and the security need are included in the profile attribute; and mapping the profile attribute to a database accessible to the gateway device in order to identify a stored profile that matches the profile attribute; and identifying a target for the backup data set based the target associated with the stored profile identified from the database;

sending the backup data set, by the gateway device, to the target identified from the database for storage using a data path that is separate from the control path, wherein the control path is not required to be part of the data path such that the identified target is determined independently of the profile attributes.

15. The gateway device of claim 14, wherein the profile attribute is associated with an list of targets that are ordered by priority, wherein the first target is selected as target for the backup data set and wherein the second target in the list of targets is selected when the first target is not available.

16. The gateway device of claim 14, wherein the profile attribute includes one or more of critical, non-critical, secured, or non-secured and the target is one of a public cloud, a private cloud, or a device, the method comprising one of:

sending the backup data set to the public cloud when the profile attribute is non-critical and/or non-secured;

sending the backup data set to the private cloud or the device when the profile attribute is critical and/or secured; and sending the backup data set to the private cloud or the device when the profile attribute is critical and/or non-secured.

17. The gateway device of claim 16, wherein the device is local to a computing system in which the backup data set is generated.

18. The gateway device of claim 14, further comprising updating the gateway database to change the targets associated with the profile attributes such that the target for the backup data set can be changed without reclassifying the backup data set.

19. The gateway device of claim 14, further comprising receiving multiple data sets at the gateway device and disseminating the multiple data sets to targets based on profile attributes of the multiple data sets, wherein at least some of the multiple data sets are sent to different targets.

* * * * *